United States Patent [19]

Stratton

[11] 4,264,998
[45] May 5, 1981

[54] WINDSHIELD WIPER FLEXOR

[75] Inventor: Donald W. Stratton, St. John, Ind.

[73] Assignee: The Anderson Company of Indiana, Gary, Ind.

[21] Appl. No.: 54,161

[22] Filed: Jul. 2, 1979

[51] Int. Cl.³ .............................................. B60S 1/02
[52] U.S. Cl. .................................... 15/250.42; 29/412
[58] Field of Search .......... 15/250.36, 250.42, 250.37, 15/250.38, 250.39, 250.40, 250.41

[56] References Cited

U.S. PATENT DOCUMENTS

| Re. 24,974 | 4/1961 | Krohn | 15/250.42 |
| 2,687,544 | 8/1954 | Scinta | 15/245 |
| 3,060,480 | 10/1962 | Ziegler | 15/250.42 |
| 3,131,413 | 5/1964 | Anderson | 15/250.42 |
| 3,702,490 | 11/1972 | Quinlan | 15/250.42 |

Primary Examiner—Edward L. Roberts

Attorney, Agent, or Firm—Wegner, Stellman, McCord, Wiles & Wood

[57] ABSTRACT

In a wiper assembly (10) for a windshield, a window, a headlight, or the like, including a flexor (20) for a resilient wiping element (21) having laterally extending tabs (45,46) and lateral indents (55,56) defined on the flexor by the lateral edges (33,34) thereof. A plurality of such flexors are cut from a sheet of material without substantial waste by orienting the flexors to be cut in abutting side-by-side relationship such that the tabs of one flexor are cut from laterally aligned indents of an adjacent flexor on the sheet. The pair of tabs (45,46) have axially spaced external shoulders (49,52) located near one end (30) of the flexor with one shoulder on each lateral side of the flexor and the pair of indents (55,56) have axially spaced internal shoulders (59,62) located near the other end (31) one on each lateral side of the flexor such that adjacent flexors are oriented 180° relative to each other when they are to be cut apart from the sheet.

11 Claims, 5 Drawing Figures

U.S. Patent    May 5, 1981    4,264,998
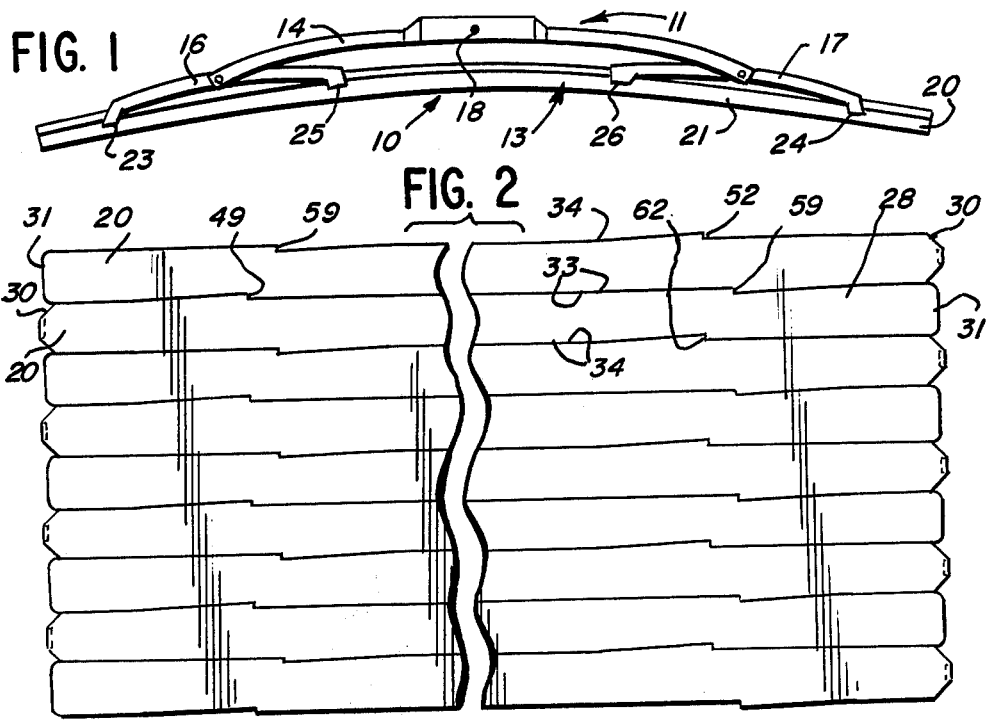
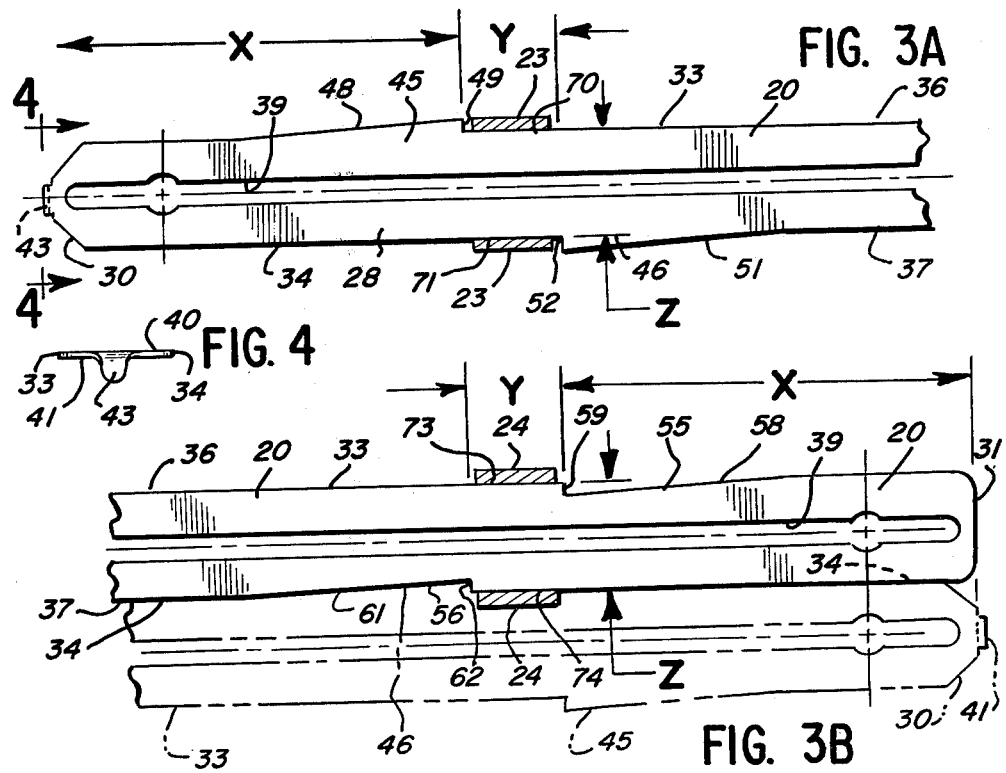

WINDSHIELD WIPER FLEXOR

DESCRIPTION

1. Technical Field

This invention relates generally to an improved windshield wiper construction and, more particularly, to an improved backing strip, or flexor, and a method for making the same substantially without waste.

2. Background Art

Wiper assemblies for wiping windshields are generally known. Such wiper assemblies include a pressure-distributing superstructure slidably connected to a flexible backing strip or flexor, which supports a resilient wiping element. The superstructure is comprised of a primary yoke and one or more secondary yokes.

The relatively flat flexor extends laterally outward of the wiping element and is formed with a plurality of laterally outwardly extending tabs to form abutting contact surfaces for the claw elements on the superstructure to maintain the axial position of the flexor relative to the claws. Typically, the tabs are disposed in two opposed pairs, one pair near each axial end of the flexor with one tab of each pair extending for each lateral edge thereof. The tabs along one such lateral edge maintain the relative position between the flexor and the claws.

The flexors are stamped from a single sheet of material, such as stainless steel, with the flexors being oriented in laterally adjacent side-by-side relation on the sheet. However, the tabs which extend from the flexor edges prevent the flexors from being oriented in abutting edge-to-edge contact. Consequently, when the flexors are cut from the sheet, a thin strip of waste material is generated between each adjacent pair of flexors. This waste necessarily increases the per unit cost of manufacturing a flexor.

A system has been used to manufacture flexors by interweaving adjacent flexors in a sheet of material so as to minimize waste between flexors, but this system requires a secondary operation on each flexor to spread the two sides of the flexor so that the flexor will be operative to trap at least one claw of a superstructure.

DISCLOSURE OF INVENTION

To overcome the problems of the prior art and to provide an inexpensive and reliable flexor, a flexor is configured such that the tabs of one flexor can be formed from slots cut in another flexor which is disposed on the same sheet of material and is adjacent to and abutting the one flexor.

In accordance with one aspect of the invention, one end portion of a flexor constructed in accordance with the present invention includes a pair of axially spaced tabs, one extending outward from each lateral side of the flexor, and the opposite end portion of the flexor includes a pair of axially spaced indents, one along each lateral side. When the flexors are to be cut from a sheet of material, the flexors are alternately flip-flopped, i.e., rotated 180° relative to each other, so that the intended indents are laterally aligned with the intended tabs of an adjacent flexor which are to be formed therefrom.

In another aspect of the invention, the tabs include camming surfaces to permit assembly of the flexor with the claws of a windshield wiper superstructure and the tabs and the indents all have congruent triangular cross sections. The remainder of the flexor has lateral edge portions which are parallel to each other and are spaced apart a distance generally equivalent to the spacing between the fingers of the claws. The claws grip the parallel flexor edges with one pair of claws being held against substantial longitudinal movement by the external shoulders of the tabs which interact with said pair of claws. The indents extend into the other end portion of the flexor at locations not engaged or gripped by the claws.

BRIEF DESCRIPTION OF DRAWINGS

FIG. 1 is an elevational view of a typical windshield wiper assembly utilizing a flexor constructed in accordance with the present invention;

FIG. 2 is an enlarged, fragmentary plan view of a series of abutting and interfitting flexors constructed in accordance with the present invention which flexors have been cut from a single sheet of material, but have not yet been separated;

FIG. 3A is an enlarged, fragmentary elevational view of one end portion of one of the flexors constructed in accordance with the present invention and illustrated in FIG. 2;

FIG. 3B is an enlarged, fragmentary elevational view of the other end portion of the flexor shown in FIG. 3A with a laterally adjacent flexor indicated in phantom; and FIG. 4 is a side elevational view of the flexor taken along line 4—4 of FIG. 3A.

BEST MODE FOR CARRYING OUT THE INVENTION

Referring to the drawings, and particularly to FIG. 1, a wiper assembly, generally designated 10, is illustrated and is seen to include a pressure-distributing superstructure, generally designated 11, and a wiper blade assembly, generally designated 13. The superstructure 11 preferably comprises a bridge or primary yoke 14 and secondary yokes 16 and 17 with the primary yoke 14 having its ends pivotally connected to portions of secondary yokes 16 and 17. The primary yoke 14 has a connector 18 located intermediate the ends thereof which is adapted to be operatively connected to a wiper arm (not shown) which drives the complete wiper assembly 10 back and forth across the surface to be wiped.

The wiper blade assembly 13 comprises an elongate, flexible backing strip, or flexor 20, and a resilient rubber-like wiping element 21 carried by the flexor 20. The flexor 20 is made from relatively thin stainless steel, is flexible in a plane perpendicular to a windshield and is substantially inflexible in a plane parallel to the windshield. The secondary yokes 16 and 17 have pairs of outboard claws 23 and 24, respectively, and pairs of inboard claws 25 and 26, respectively. As is conventional, each claw of each pair of claws 23-26 has an inturned portion or finger which extends past the edge of the flexor 20 and overlaps the bottom surface thereof. Herein, the pairs of outboard claws 23 and 24 engage the flexor 20 either at or near the outer ends of the wiper blade assembly 13, while the pairs of inboard claws 25 and 26 engage the flexor 20 at an intermediate location.

Referring to FIG. 2, a series or strip of flexors are shown in abutting, interfitting edge-to-edge relation as cut, but unseparated, from a single sheet of material 27. The flexors in the series are alternately flip-flopped, i.e., rotated 180° relative to each other, so that the mounting tabs adjacent one end of one flexor may be cut from the nonfunctional indents at the opposed end of an adjacent flexor and vice versa as will be described in more detail hereinafter.

As best seen in FIGS. 3A and 3B, the flexor 20 is formed from an elongate member 28 having opposed spaced axial ends 30 and 31 and opposed spaced lateral edges 33 and 34. The lateral edges 33 and 34 extend between the axial ends 30 and 31 and are parallel to each other over the greater portions thereof including intermediate lateral edge portions 36 and 37, respectively. A longitudinal opening 39 for mounting the resilient wiping element 21 therein extends between the respective upper and lower flexor surfaces 40 and 41 and terminates just short of the flexor ends 30 and 31. Located at the axial end 30 and extending transverse to the plane of said flexor 20 is an optional end tab 43 (FIG. 4).

As seen in FIG. 3A, spaced axially outward from the center of the flexor 20 generally adjacent the left axial end 30 and defined by lateral edges 33 and 34 are a pair of mounting and positioning tabs 45 and 46. The tab 45 extends laterally outward from the lateral edge 33 and includes a camming surface, or skewed edge portion 48. The skewed edge portion 48 extends axially away from the end 30 at an acute angle to the lateral edge 33 and terminates at its inward end at an external shoulder 49. Similarly, the tab 46 extends laterally outward from the lateral edge 34 and includes a skewed edge portion 51. The skewed edge portion 51 extends axially toward the end 30 at an acute angle to the lateral edge 34 and terminates at its outward end at an external shoulder 52. For reasons to be discussed later, the external shoulder 52 is positioned a short distance axially along the flexor from the external shoulder 49.

As seen in FIG. 3B, spaced axially outward from the center of the flexor 20 generally adjacent the right axial end 31 and defined by lateral edges 33 and 34 are a pair of nonfunctional indents 55 and 56. The indent 55 is formed laterally inward of the lateral edge 33 and includes a skewed edge portion 58. The skewed edge portion 58 extends axially away from the end 31 at an acute angle to the lateral edge 33 and terminates at its inward end at an internal shoulder 59. Similarly, the indent 56 is formed laterally inward of the lateral edge 34 and includes a skewed edge portion 61. The skewed edge portion 61 extends axially from the end 31 at an acute angle to the lateral edge 34 and terminates at its outward end at an internal shoulder 62. As with the external shoulders 49 and 52, the internal shoulder 62 is positioned a short distance axially along the flexor from the internal shoulder 59.

The relative configurations and sizes of the tabs 45 and 46 and the indents 55 and 56 are such that the cross-sectional configuration and size of the tab 45 and the indent 55 are substantially identical and the cross-sectional configuration and the size of the tab 46 and the indent 56 are substantially identical. Specifically, in the embodiment disclosed herein, each of the tabs 45 and 46 and the indents 55 and 56 have an acute triangular cross section, all of which are substantially congruent in shape and size to the others. Thus, the height of the tabs 45 and 46 is substantially equal to the depth of the indents 55 and 56.

As seen in FIG. 3A, the external shoulder 49 is located an axial distance X from the axial end 30 and, as seen in FIG. 3B, the internal shoulder 59 is located the same axial distance X from the axial end 31. Thus, when the flexors are oriented in abutting adjacent flip-flopped arrangement or series, the tabs 45 will be laterally aligned with the indents 55 so that the tabs 45 and the indents 55 are fittable with each other.

Similarly, the external shoulder 52 is located an axial distance Y inward from the external shoulder 49, while the internal shoulder 62 is located the same axial distance Y inward from the internal shoulder 59. Thus, the tabs 46 will also be laterally aligned with the indents 56 when the flexors are flip-flopped so that the tabs 46 and the indents 56 are fittable with each other as illustrated by the flexor 20 and the phantom flexor in FIG. 3B.

For purposes of illustration, in the particular embodiment of the flexor shown herein, the flexor 20 is roughly twenty inches in length and the outermost shoulders 49 and 59 lie one to two inches (distance X) from the axial ends 30 and 31, respectively. The length of the claws 23 and 24 is slightly less than three-sixteenths of an inch, the approximate Y distance.

When the flexors are in edge-to-edge contact, the respective edges 33 of adjacent flexors abut as do the respective edges 34. Also, the respective axial ends 30 and 31 are roughly aligned along the edge of the sheet of material 27.

The width of the flexor 20 as measured between the parallel lateral edges 33 and 34 is a distance Z. This distance Z is about three-eighths of an inch in the example under discussion, and is substantially equal to the distance between the fingers 70 and 71 of the pair of outboard claws 23 (FIG. 3A) and to that between claw fingers 73 and 74 of the pair of outboard claws 24 (FIG. 3B). When the outboard claws 23 of the yoke 16 or 17 is engaged with the flexor 20, the claw fingers 70 and 71 will wrap around the edges 33 and 34 between the spaced external shoulders 49 and 52 and overlap the lower surface 41 of the flexor. The flexor 20 may be positioned within the pairs of claws 23-26 by sliding the end 31 of the flexor into the space between the fingers of the pairs of claws 23-26. As the flexor 20 is moved axially consecutively through the pairs of claws 24, 26, 25 and 23, the claw finger 71 will eventually ride onto the camming surface 51 and will deflect the sides of the flexor inwardly against the resilience of the rubber wiping element to allow the claw 71 to pass. When the claw finger 70 abuts the external shoulder 49, further axial movement of the flexor 20 is prevented.

When the flexor 20 is mounted on the yokes 16 and 17, the fingers 73 and 74 of the pair of outboard claws 24 will ride along the parallel lateral edges 33 and 34 between axially spaced shoulders 59 and 62 of the indents 55 and 56. The indents 55 and 56 will, in reality, serve no functional purpose, since they are only the cutouts for the tabs 45 and 46 of adjacent flexors. Since the spacing between the indents 55 and 56 is a distance Y, a distance greater than the length of the pair of claw fingers 73 and 74, the claw fingers 73 and 74 will fully engage the flexor 20 and will not reside over the indents 55 and 56.

As should be apparent, the inboard claws 25 and 26 reside on the intermediate portion of the flexor between the tabs 45 and 46 and the indents 55 and 56 when the flexor is installed on the superstructure 11.

INDUSTRIAL APPLICABILITY

The flexor design disclosed herein enables the manufacturer of windshield wiper assemblies to substantially eliminate waste material created when a strip of flexors is cut from a sheet of material. This advantageous result is achieved by constructing a flexor having parallel edges adapted to engagingly receive the pairs of claws of a supporting yoke and having mounting tabs and nonfunctional indents configured and arranged such that the flexors may be laid out on a sheet of material in abutting edge-to-edge contact with the tabs of one flexor being cut to form the indents of an adjacent flexor. It should be apparent that material waste is minimized along the edges of the material sheet adjacent the axial ends of the flexor.

I claim:

1. A flexor element (20) comprising an elongate member (28) having opposed axial ends (30,31) and opposed lateral edges (33,34) extending between said axial ends, said lateral edges said parallel to each other over a portion thereof and defining tabs (45,46) and indents (55,56) over a portion of the remainder thereof, one edge (33) having a tab (45) spaced from one end (30) with a skewed edge portion (48) extending laterally outward and axially away from said one end to define a first external shoulder (49) at the inward end thereof, said one edge also having an indent (55) spaced from the other end (31) with a skewed edge portion (58) extending laterally inward and axially toward said other end to define a first internal shoulder (59) at the inward end thereof, the opposite edge (34) having a tab (46) spaced from said one end with a skewed edge portion (51) extending laterally outward and axially toward said one end (30) to define a second external shoulder (52) at the outward end thereof which is axially spaced inward of said first external shoulder, said opposite edge (34) also having an indent (56) spaced from said other end (31) with a skewed edge portion (61) extending laterally inward and axially away from said other end (31) to define a second internal shoulder (62) at the outward end thereof which is axially spaced inward of said first internal shoulder (59).

2. The flexor element (20) of claim 1 wherein said tabs (45,46) have a height substantially equal to the depth of said indents (55,56).

3. The flexor element (20) of claim 2 wherein said tabs (45,46) and said indents (55,56) have substantially similar cross sections.

4. The flexor element (20) of claim 1 wherein the axial distance between said external shoulders (49,52) is substantially equal to the axial distance between said internal shoulders (59,62).

5. A flexor element (20) comprising an elongate member (28) having opposed axial ends (30,31) and opposed lateral edges (33,34) extending between said axial ends, said lateral edges being parallel to each other over a portion thereof and defining tabs (45,46) and indents (55,56) over a portion of the remainder thereof, one edge (33) having a tab (45) spaced from one end (30) to define a first external shoulder (49) at the inward end thereof, said one edge also having an indent (55) spaced from the other end (31) to define a first internal shoulder (59) at the inward end thereof, the opposite edge (34) having a tab (46) spaced from said one end (30) to define a second external shoulder (52) at the outward end thereof which is axially inward of said first external shoulder (49), said opposite edge also having an indent (56) spaced from said other end (31) to define a second internal shoulder (62) at the outward end thereof which is axially inward of said first internal shoulder (59).

6. The flexor element (20) of claim 5 wherein the axial distance between said external shoulders (49,52) is substantially equal to the axial distance between said internal shoulders (59,62), whereby a flexor when placed in flip-flopped relation to an adjacent flexor has tabs (45,46) which may be laterally aligned with indents (55,56) in the adjacent flexor.

7. The flexor element (20) of claim 6 wherein said tabs (45,46) and indents (55,56) have substantially congruent triangular cross sections with the respective edges defining an edge portion (48,51,58,61) angularly disposed to the remainder of the edge, whereby the tabs (45,46) of a flexor may be fitted into the indents (55,56) of an adjacent flexor.

8. The flexor element (20) of claim 5 wherein the lateral width of the flexor measured between parallel edge portions is substantially equal to the width of the fingers (70,71,73,74) of the pairs of claws of a supporting superstructure (11) that mounts on the flexor.

9. A flexor element (20) for a windshield wiper assembly having at least one yoke member (16,17) with pairs of claw elements (23,24,25,26), said flexor element comprising an elongate member (28) having opposed axial ends (30,31) and opposed lateral edges (33,34) extending between said axial ends, said lateral edges being parallel to each other over a portion thereof and defining tabs (45,46) and indents (55,56) over a portion of the remainder thereof, a first tab (45) being spaced from one axial end and defining a first external shoulder (49) at the inward end thereof, a second tab (46) defining a second external shoulder (52) axially spaced from said first external shoulder, a first indent (55) being spaced from the other axial end and defining a first internal shoulder (59) at the inward end thereof, a second indent (56) defining a second internal shoulder (62) axially spaced from said first internal shoulder, said tab external shoulders (49,52) interacting with the sides of one pair of claws of one yoke member (16,17) positioned therebetween to axially locate the flexor relative to the claws and the indents (55,56) being nonfunctional, whereby a series of such flexors may be cut from a single sheet of material without substantial waste by orienting the flexors to be cut in abutting side-by-side relationship such that one tab (45,46) of one flexor is cut from the laterally aligned indent (55,56) of an adjacent flexor on the sheet.

10. A flexor element (20) for a windshield wiper blade (13) which is carried between the spaced fingers (70,71,73,74) of the pairs of claws (23,24,25,26) of a pressure-distributing superstructure (11), said flexor comprising an elongate member (28) having a longitudinal opening (39) between its upper and lower surfaces (40,41) for mounting a resilient wiping element (21) therein, said opening extending axially and terminating adjacent opposed axial ends (30,31) of said elongate member, said elongate member having lateral edges (33,34) adapted for engagement by the claws and being parallel to each other over a portion thereof at a spacing generally equal to the lateral spacing between the claw fingers, said lateral edges defining tabs (45,46) and indents (55,56) over a portion of the remainder thereof, one edge (33) having a tab (45) adjacent one end (30) with a camming surface (48) extending laterally outward and axially inward from said one end to define a first external shoulder (49) at the inward end thereof, said one edge also having an indent (55) adjacent the other end (31) with a camming surface (58) extending laterally inward and axially inward from said other end to define a first internal shoulder (59) at the inward end thereof, the opposite edge (34) having a tab (46) adjacent said one end with a camming surface (51) extending laterally outward and axially outward toward said one end to define a second external shoulder (52) at the outward end thereof which is axially spaced from said first external shoulder, said opposite edge also having an indent (56) adjacent said other end with a camming surface (61) extending laterally inward and axially outward from said other end to define a second internal shoulder (62) at the outward end thereof which is axially spaced from said first internal shoulder.

11. The flexor element (20) of claim 10 wherein said tabs (45,46) and indents (55,56) have substantially congruent triangular cross sections and the axial distance between said external shoulders (49,52) is substantially equal to the axial distance between said internal shoulders (59,62), whereby a flexor when placed in flip-flopped relation to an adjacent flexor has tabs (45,46) which are fitable into indents (55,56) of the two immediately adjacent flexors such that flexors so arranged in abutting edge-to-edge relation may be cut from a single sheet of material without generating a strip of waste material between adjacent flexors.

* * * * *

UNITED STATES PATENT AND TRADEMARK OFFICE
CERTIFICATE OF CORRECTION

PATENT NO. : 4,264,998
DATED : MAY 5, 1981
INVENTOR(S) : DONALD W. STRATTON

It is certified that error appears in the above-identified patent and that said Letters Patent are hereby corrected as shown below:

Column 1, line 24, "for" should be --from--.

Column 5, line 13, "said" (second occurrence) should be --being--.

Signed and Sealed this

Eleventh Day of August 1981

[SEAL]

Attest:

GERALD J. MOSSINGHOFF

*Attesting Officer*  *Commissioner of Patents and Trademarks*